(12) United States Patent
Ussner et al.

(10) Patent No.: US 12,728,871 B2
(45) Date of Patent: Sep. 8, 2026

(54) CONTROL DEVICE AND METHOD FOR ESTIMATING DRIVING RANGE FOR A VEHICLE

(71) Applicant: Scania CV AB, Södertälje (SE)

(72) Inventors: Matthias Ussner, Södertälje (SE); Jukka Hyttinen, Södertälje (SE); Svante Johansson, Vällingby (SE); Antonius Kies, Södertälje (SE); Tony Sandberg, Strängnäs (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 18/858,822

(22) PCT Filed: Apr. 25, 2023

(86) PCT No.: PCT/SE2023/050376
§ 371 (c)(1),
(2) Date: Oct. 22, 2024

(87) PCT Pub. No.: WO2023/211340
PCT Pub. Date: Nov. 2, 2023

(65) Prior Publication Data

US 2025/0276701 A1 Sep. 4, 2025

(30) Foreign Application Priority Data

Apr. 29, 2022 (SE) .................................. 2250513-5
Apr. 29, 2022 (SE) .................................. 2250514-3
Apr. 29, 2022 (SE) .................................. 2250515-0

(51) Int. Cl.
*B60W 40/10* (2012.01)
*B60W 20/12* (2016.01)
(Continued)

(52) U.S. Cl.
CPC ........ *B60W 40/1005* (2013.01); *B60W 20/12* (2016.01); *B60W 40/12* (2013.01);
(Continued)

(58) Field of Classification Search
CPC ...... B60W 10/06; B60W 10/08; B60W 10/26; B60W 20/12; B60W 40/12;
(Continued)

(56) References Cited

U.S. PATENT DOCUMENTS 6,269,289 B1 * 7/2001 Toukura .............. B60W 30/188
73/146
6,314,347 B1 11/2001 Kuroda et al.
(Continued)

FOREIGN PATENT DOCUMENTS

CN 111516552 A 8/2020
DE 102015109500 A1 12/2015
(Continued)

OTHER PUBLICATIONS

Scania CV AB, International Patent Application No. PCT/SE2023/050376, International Preliminary Report on Patentability, Oct. 29, 2024.

(Continued)

*Primary Examiner* — Hai H Huynh
*Assistant Examiner* — Johnny H Hoang
(74) *Attorney, Agent, or Firm* — Moore & Van Allen PLLC; W. Kevin Ransom

(57) ABSTRACT

A control device and a method for estimating a driving range for a vehicle. The method comprises, based on available driving energy for the vehicle, estimating distance to empty taking into account an estimated variation in rolling resistance of the vehicle, wherein said estimated variation in rolling resistance of the vehicle is determined using a predetermined transient rolling resistance model into which
(Continued)

transient tire temperature effects on rolling resistance are incorporated.

23 Claims, 9 Drawing Sheets

(51) Int. Cl.
*B60W 40/12* (2012.01)
*B60W 50/00* (2006.01)

(52) U.S. Cl.
CPC . *B60W 50/0097* (2013.01); *B60W 2050/0028* (2013.01); *B60W 2300/125* (2013.01); *B60W 2510/244* (2013.01); *B60W 2520/04* (2013.01); *B60W 2520/10* (2013.01); *B60W 2530/10* (2013.01); *B60W 2530/16* (2013.01); *B60W 2530/20* (2013.01); *B60W 2555/20* (2020.02)

(58) Field of Classification Search
CPC ......... B60W 40/1005; B60W 2520/04; B60W 2050/0028; B60W 2510/244; B60W 2300/125; B60W 2530/10; B60W 2530/20; B60W 2555/20
USPC .......................................................... 701/123
See application file for complete search history.

(56) References Cited

U.S. PATENT DOCUMENTS 6,871,162 B2 3/2005 Futamura et al.
9,552,678 B2 1/2017 Meyer et al.
9,759,573 B2 9/2017 Meyer et al.
10,415,986 B2 9/2019 Meyer et al.
10,570,819 B1 2/2020 Bear
11,203,271 B2 12/2021 Cha et al.
11,400,946 B2 * 8/2022 Cordonnier ............ B60W 10/11
11,525,728 B1 12/2022 Petersen et al.
11,708,074 B2 7/2023 Lacaze et al.
11,865,875 B2 1/2024 Birdsall et al.
12,036,998 B2 7/2024 Ge et al.
12,067,809 B2 8/2024 Braunstein et al.
12,291,215 B2 5/2025 Petersen et al.
12,469,344 B2 11/2025 Toyoda et al.
2004/0068391 A1 4/2004 Futamura et al.
2005/0085987 A1 4/2005 Yokota et al.
2010/0010795 A1 1/2010 Fevrier et al.
2010/0138142 A1 6/2010 Pease
2011/0087390 A1 4/2011 Pandit et al.
2013/0253782 A1 * 9/2013 Saltsman ............ G01M 17/007 703/8
2015/0239455 A1 8/2015 Qiu et al.
2015/0360525 A1 * 12/2015 Singh ..................... G01K 13/08 374/141
2015/0367856 A1 12/2015 Meyer et al.
2016/0023554 A1 1/2016 Tseng et al.
2016/0040995 A1 2/2016 Kano et al.
2016/0061610 A1 3/2016 Meyer et al.
2016/0061611 A1 3/2016 Meyer et al.
2016/0063771 A1 3/2016 Meyer et al.
2016/0097652 A1 4/2016 Liu et al.
2016/0129803 A1 5/2016 Grewal et al.
2016/0129918 A1 5/2016 Skaff et al.
2016/0193919 A1 * 7/2016 Zhang ..................... B60L 15/20 180/197
2018/0029500 A1 2/2018 Katanoda
2020/0164889 A1 5/2020 Cordonnier et al.
2020/0171972 A1 6/2020 Cha et al.
2020/0265654 A1 8/2020 Kapadia et al.
2021/0229508 A1 * 7/2021 Domprobst ............. B60C 23/20
2021/0253097 A1 8/2021 Lacaze et al.
2023/0085950 A1 3/2023 Weston et al.
2023/0127005 A1 4/2023 Chen et al.
2023/0194281 A1 6/2023 Lane et al.
2023/0196846 A1 6/2023 Braunstein et al.
2023/0377377 A1 11/2023 Kim et al.
2025/0236299 A1 7/2025 Song et al.
2025/0276701 A1 9/2025 Ussner et al.

FOREIGN PATENT DOCUMENTS

DE 102015113431 A1 3/2016
DE 102015116600 A1 4/2016
DE 102017124735 A1 4/2019
EP 2957440 A1 12/2015
GB 2550282 A 11/2017
GB 2561409 A 10/2018
JP 2012101762 A 5/2012
WO 2019016471 A1 1/2019

OTHER PUBLICATIONS

Scania CV AB, International Patent Application No. PCT/SE2023/050376, International Search Report, Jun. 30, 2023.
Scania CV AB, International Patent Application No. PCT/SE2023/050376, Written Opinion, Jun. 30, 2023.
Scania CV AB, Swedish Patent Application No. 2250515-0, Office Action, Nov. 24, 2022.
Scania CV AB, Swedish Patent Application No. 2250513-5 Office Action, Nov. 24, 2022.
Ebbot, T.G., et al., "Tire Temperature and Rolling Resistance Prediction with Finite Element Analysis", Tire Science and Technology, TSTCA, Jan.-Mar. 1999, pp. 15-21, vol. 27, No. 1.
Ejsmont, Jerzy, et al., "Influence of temperature on the tyre rolling resistance", International Journal of Automotive Technology, The Korean Society of Automotive Engineers, Heidelberg, Oct. 3, 2017, pp. 45-54, vol. 19, No. 1.
Ejsmont, Jerzy, et al., "Temperature Influence on Tire Rolling Resistance Measurements Quality", International Journal of Automotive Technology, The Korean Society of Automotive Engineers, Heidelberg, Feb. 1, 2022, pp. 109-123, vol. 23, No. 1.

* cited by examiner

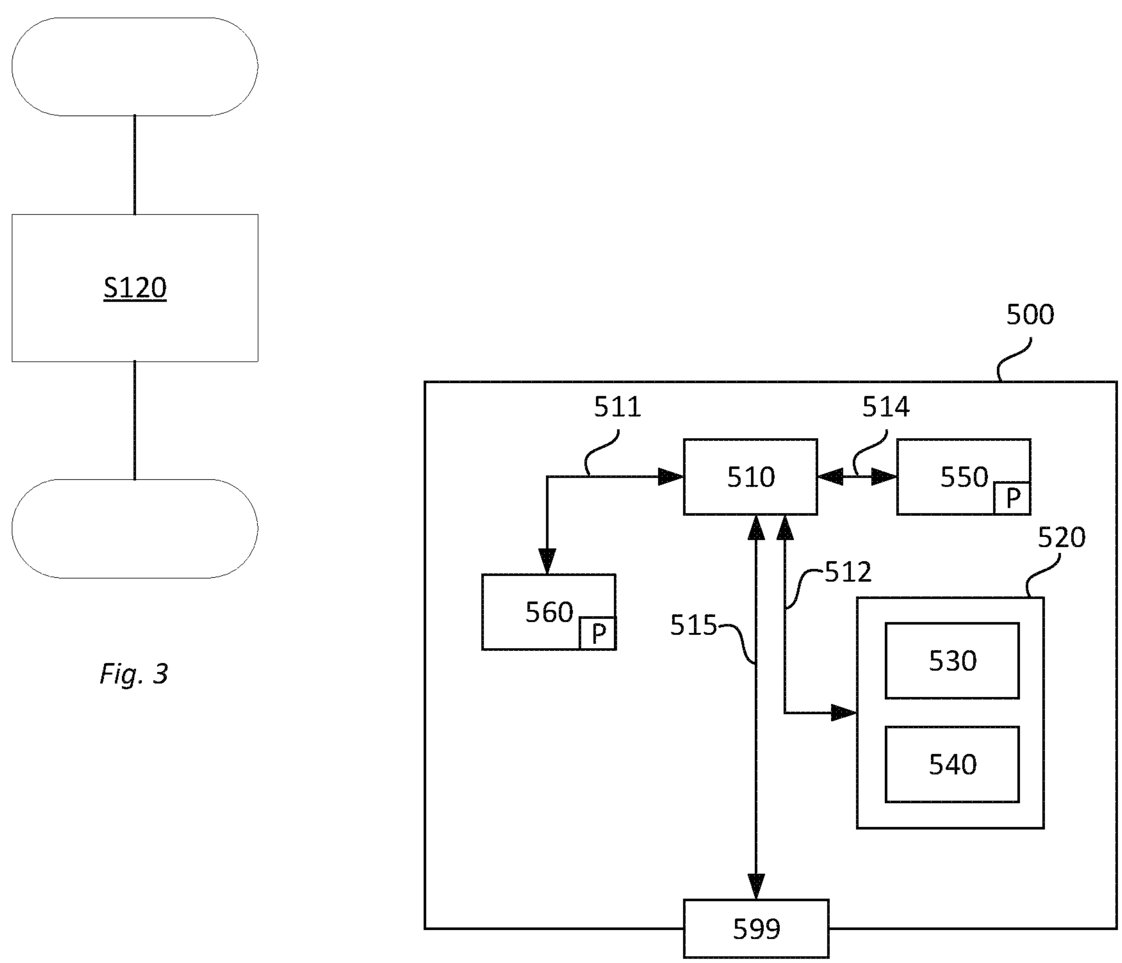
Fig. 3
Fig. 4
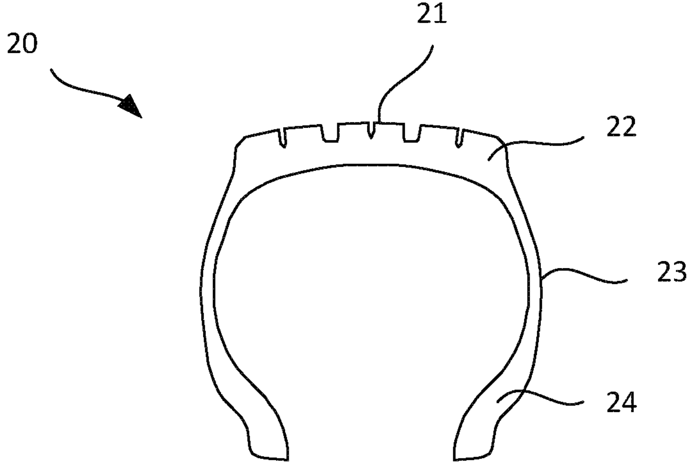
Fig. 5

*(a)*

*(b)*

CONTROL DEVICE AND METHOD FOR ESTIMATING DRIVING RANGE FOR A VEHICLE

CROSS-REFERENCE TO RELATED APPLICATIONS

This application is a national stage application (filed under 35 § U.S.C. 371) of PCT/SE2023/050376, filed Apr. 25, 2023 of the same title, which, in turn claims priority to the following Swedish Application Nos. 2250513-5, 2250514-3, and 2250515-0, each filed on Apr. 29, 2022; the contents of each of which are hereby incorporated by reference.

TECHNICAL FIELD

The present disclosure relates in general to a method for estimating driving range for a vehicle. Moreover, the present disclosure relates in general to a control device configured to estimate driving range for a vehicle. Furthermore, the present disclosure relates in general to a computer program and a computer-readable medium. The present disclosure also relates in general to a vehicle.

BACKGROUND

The strive to reduce emissions and improve fuel economy of heavy vehicles, such as trucks and buses, has led to the development of vehicles comprising propulsion systems that uses one or more electrical machines powered by batteries. Examples of such vehicles include Hybrid Electric Vehicles (HEVs), Plug-in Hybrid Electric Vehicles (PHEVs), and Battery Electric Vehicles (BEVs). One of the most important factors to consider for this type of vehicle is the driving range. Every small increment of improved efficiency accounts and is making significant impact to green-house gas emissions. The energy efficiency and desired driving range have a direct impact on the necessary size of the batteries, and thereby also the manufacturing costs as well as operating costs of the vehicle.

The predicted driving range, based on available energy in a vehicle, is commonly referred to as distance to empty (DTE), or driving range. It is previously known to estimate driving range for example by considering historical data regarding average energy consumption rates or efficiency of the vehicle and available energy. However, the accuracy of such an estimation is generally poor since the energy consumption of a vehicle is affected by a large number of factors that may vary largely over time. If the driving range cannot be sufficiently accurate determined, it may be necessary to increase the back-up energy stored onboard the vehicle to account for potential errors in said estimation. This may in turn affect the number and/or duration of charging operations needed, and/or require an increase of the battery size in the vehicle to safely ensure desired driving range. Thus, a more accurate estimation of driving range would have potential to provide a considerable reduction of total cost of operation of the vehicle during the service life thereof.

SUMMARY

The object of the present invention is to improve an estimation of driving range for a vehicle, in particular for use in transport planning.

The object is achieved by the subject-matter of the appended independent claims.

The present disclosure provides a method, performed by a control device, for estimating a driving range (DTE) for a vehicle. The method comprises, based on available driving energy for the vehicle, estimating driving range taking into account an estimated variation in rolling resistance of the vehicle, wherein said estimated variation in rolling resistance of the vehicle is determined using a predetermined transient rolling resistance model into which transient tire temperature effects on rolling resistance are incorporated.

By means of the present method, the accuracy in the estimation of a vehicle's driving range is significantly improved since it takes into account the variation in rolling resistance that may occur during a driving event. This means that a higher trust in the estimation of driving range may be achieved from a user of the vehicle. This also means that less back-up driving energy need to be stored onboard the vehicle. This in turn improves the total cost of operation of the vehicle.

Further, the present disclosure provides a method, performed by a control device, for transport planning. The method comprises estimating a driving range, by the method for estimating driving range described herein, for a planned upcoming driving event, determining whether the estimated driving range is sufficient for completing the planned upcoming driving event, and then approving (e.g. executing, authorizing, allowing) or adjusting the planned upcoming driving event based on whether the estimated driving range is determined to be sufficient or not. Adjusting may refer to replanning, e.g. skipping one or more planned stops and/or stretches (portions), or to providing more driving energy to the vehicle before commencing the driving event, or rescheduling (postponing or advancing) the driving event to a point in time when an ambient temperature or other condition is anticipated to be more beneficial for the driving range. The upcoming driving event may comprise a plurality of portions (parts), and one or more planned intermediate stops. The portions and stops are each being associated with a variation in tire rubber temperature. For the case where the estimated driving range is more than sufficient for completing the planned upcoming driving event, further portions or stops can be added to the plan for the upcoming driving event.

Thereby, the driving range of a vehicle before an upcoming driving event can be more accurately determined, and thus give a more reliable result of transport planning. Fewer unforeseen replenishments of driving energy are needed, and commitments such as arrival times can be held in a more reliable way. This will be very advantageous e.g. for driving events comprising several longer or shorter stops, such as for delivery tours or city buses, since such intermediate stops affect the rolling resistance, and thus the driving range, more than previously realized.

The predetermined transient rolling resistance model may advantageously take into account ambient temperature. Thereby, the accuracy of the estimation of the vehicle's driving range is further improved.

The predetermined transient rolling resistance model may further take into account at least one parameter causing cooling of the tire during driving of the vehicle. Thereby, the accuracy of the estimation of the vehicle's driving range is further improved. The at least one parameter causing cooling of the tire during driving may comprise rain, wet road condition and/or aerodynamic cooling.

The predetermined transient rolling resistance model may further take into account vehicle speed. Thereby, the accuracy of the estimation of the vehicle's driving range is further improved.

Moreover, the predetermined transient rolling resistance model may take into account an estimated transient temperature of the tires determined based on predicted driving conditions of the vehicle. This further improves the accuracy in the estimated driving range.

The predetermined transient rolling resistance model may also take into account a predicted or measured initial temperature of the tire at a start of a planned driving event. This further improves the accuracy in the estimated driving range.

Furthermore, according to one embodiment, the predetermined transient rolling resistance model may be adapted to calculate a time-dependent adjusted rolling resistance coefficient based on a predetermined rolling resistance coefficient determined according to a standardized procedure. This further improves the accuracy in the estimated driving range.

The present disclosure further relates to a computer program comprising instructions which, when executed by a control device, cause the control device to carry out the method as described above.

The present disclosure further relates to a computer-readable medium comprising instructions which, when executed by a control device, cause the control device to carry out the method as described above.

Moreover, in accordance with the present disclosure, a control device configured to estimate driving range for a vehicle is provided. The control device is configured to:

i. based on available driving energy for the vehicle, estimate driving range taking into account an estimated variation in rolling resistance of the vehicle,
ii. wherein the estimated variation in rolling resistance of the vehicle is determined using a predetermined transient rolling resistance model into which transient tire temperature effects on rolling resistance are incorporated.

The control device provides the same advantages as described above with reference to the corresponding method for estimating driving range for a vehicle.

The present disclosure further provides a vehicle comprising the control device described above. The vehicle may be a heavy land-based vehicle, such as a truck or a bus. The vehicle may be a battery electric vehicle, a hybrid vehicle, a plug-in hybrid vehicle, or a fuel cell vehicle, but is not limited thereto.

BRIEF DESCRIPTION OF DRAWINGS

FIG. 3 represents a flowchart schematically illustrating one exemplifying embodiment of the method for estimating a driving range for a vehicle according to the present disclosure, FIG. 4 schematically illustrates an exemplifying embodiment of a device that may constitute, comprise or be a part of the control device configured to estimate a driving range for a vehicle according to the present disclosure, FIG. 5 schematically illustrates a cross-sectional view of a tire.

DETAILED DESCRIPTION

Figure 1:
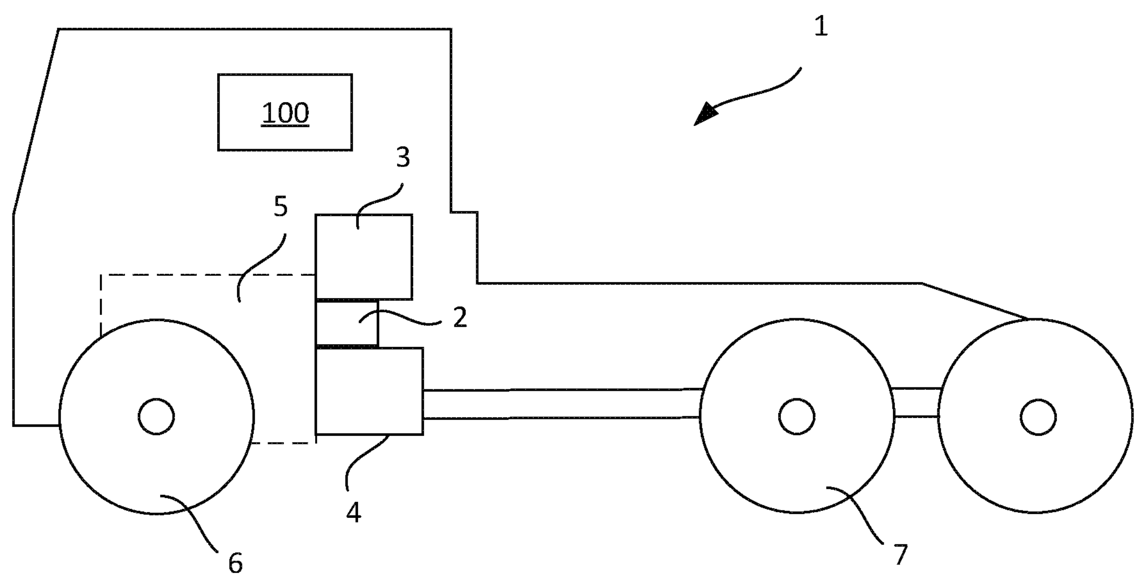
FIG. 1 schematically illustrates a side view of an example of a vehicle.

The invention will be described in more detail below with reference to exemplifying embodiments and the accompanying drawings. The invention is however not limited to the exemplifying embodiments discussed and/or shown in the drawings, but may be varied within the scope of the appended claims. Furthermore, the drawings shall not be considered drawn to scale as some features may be exaggerated in order to more clearly illustrate the invention or features thereof.

The present disclosure relates to a method for estimating a vehicle's driving range. The term "distance to empty" or "driving range" as used herein is intended to mean the range the vehicle may be driven based on the vehicle's available driving energy. Said driving energy may for example be stored in an energy storage device, such as an energy storage device comprising one or more batteries, and/or be in form of liquid or gaseous fuel (such as in the case of biogas driven vehicles or fuel cell vehicles) onboard the vehicle.

The herein described method is primarily developed for use in conjunction with vehicles comprising a propulsion unit that may be powered by an energy storage device, such as a hybrid vehicle, a fully electric vehicle or a fuel cell vehicle. It should however be noted that the herein described method may also be utilized for other vehicles, such as conventional vehicles driven (solely) by a combustion engine. The vehicle is however a land-based vehicle comprising tires. Furthermore, the herein described method is primarily developed for a heavy commercial vehicle, such as a truck or a bus. The method may however be used also for other vehicles, such as passenger cars or a vehicle belonging to the lightweight or medium weight segment of trucks, if desired.

In general, driving range may be estimated by considering the propulsion power needed for driving the vehicle as planned or desired and the available driving energy (i.e. available propulsion energy). The propulsion power is in turn dependent on the force opposing the vehicle's motion, the vehicle's efficiency (more specifically, powertrain efficiency), and the vehicle speed. The force opposing the vehicle's motion comprises the sum of a force caused by rolling resistance, a force caused by air resistance and a force caused by slope of the road. Also, the driving range is affected by other energy consumers of the vehicle, for example systems for climatizing the interior of the vehicle or systems for controlling operating temperature of the energy storage device. Thus, it is evident that the instantaneous propulsion power needed will vary over time during a driving event, for example due to possible variation in vehicle speed and characteristics of the road.

One of the largest parts of the power losses for heavy vehicles is caused by tire rolling resistance, as mentioned above. Today, tire manufacturers are required to test rolling resistance in accordance with standardized tests in order to obtain certain labels. For example, in Europe, to obtain the UNECE R117 label (Amendment of Rolling Resistance in R117, 2009) the tire manufacturers are mandated to test rolling resistance according to the ISO 28580:2009 test standard. This test method merely provides a value of stabilized rolling resistance at +25° C. ambient temperature after 3 h. This is a convenient method to compare rolling resistance of different tires. However, in real road applications, rolling resistance is much more complex. This in turn results in difficulties if the rolling resistance provided according to this standard is used in simulations of driving energy consumption for a vehicle. More specifically, one of the drawbacks of the ISO 28580:2009 test standard is that it does not take into account variations of ambient temperature or transient rolling resistance. Other test standards exist, such as SAE J1269 and SAE J2452. SAE J2452 considers also vehicle speed, which is advantageous. However, SAE J1269 and SAE J2452 also have the drawback of not considering the effects of transient rolling resistance and different ambient temperatures.

The European Commission has developed a vehicle energy consumption calculation tool called VETCO, with the purpose of determining $CO_2$ emissions and fuel consumption from heavy duty Vehicles with a Gross Vehicle Weight above 3500 kg. The inputs for VECTO are characteristic parameters to determine the power consumption of every relevant vehicle component. Amongst others, the parameters for rolling resistance, air drag, masses and inertias, gearbox friction, auxiliary power and engine performance are input values to simulate fuel consumption and $CO_2$ emissions on standardized driving cycles. However, the tool uses constant rolling resistance values and disregards the effect of ambient temperature on rolling resistance and transient rolling resistance.

To improve the prediction of driving energy consumption in real operational conditions and estimations using various simulation tools, it would be beneficial to obtain more data regarding rolling resistance at various ambient temperatures and different operating conditions of the vehicle.

Most of the rolling resistance is related to the viscoelastic behavior of tire rubber when strain is imposed while rolling. In a rolling motion, the rubber compresses at the leading edge of the tire contact patch and decompresses at the trailing edge of the contact patch. These subsequent loading and unloading events form an asymmetric contact pressure that shifts the resultant force in front of the tire rotation axis with an offset. This shifted resultant force creates a braking moment, which is the largest part of the rolling resistance. Moreover, viscoelasticity dissipates energy into heat that in turn cause warming of the tire.

The loading and unloading of the rubber causes hysteresis resulting from reorganization of entanglements of polymer chains and breaking of vas der Waals bonds, which are affected by temperature. Thus, rolling resistance increases with decreasing temperature of the tire rubber.

During driving of a vehicle, the tire warms up until the strain-induced heating effect and cooling effects from the surrounding environment (and road) reach a thermal balance. During this warm-up period rolling resistance is decreased considerably, and results in transient rolling resistance. Transient rolling resistance can also occur as a result of for example change in vehicle speed and/or sudden change in weather condition.

The research performed until now has not resulted in a complete understanding of rolling resistance under realistic driving conditions, except in situations where steady-state conditions are present. However, the present inventors have performed extensive testing, part of which will be described below, to investigate the effect of tire rubber temperature on rolling resistance. It has been found that transient rolling resistance resulting from temperature changes in the tire rubber, more specifically temperature changes in the circumferential portion of the tire rubber, has a great impact on driving range for a vehicle. Furthermore, it has been found that the ambient temperature also greatly affects the steady-state rolling resistance as well as the transient rolling resistance. Measuring the tire (rubber) temperature at the circumferential portion of the tire during actual driving is in practice not possible due to the difficulty in arranging a temperature sensor at a relevant position in the tire. The present inventors have found that it is possible to model the transient rolling resistance with high accuracy, and that it is therefore possible to take this into account when estimating driving range or distance to empty. This greatly improves the accuracy in such estimates.

It should be noted that this is not the same thing as measuring the tire pressure or the temperature of the air/fluid inside the tire, which are more of secondary effects, since they follow on/after the change in rubber temperature caused by rubber stress/strain-hysteresis, as described above. Therefore, when wanting to accurately estimate rolling resistance, it is important to look at the first order effect (rubber temperature), and not on less accurate results caused by the first order effect. Thus, although the tire pressure also may change due to temperature variations of the air/fluid inside the tires, these changes do not reflect the actual behavior of the rolling resistance. As mentioned above, this tire pressure (and corresponding fluid temperature) is a secondary result and will also, in addition to not accurately representing the rubber temperature/rolling resistance, have a time delay to the actual rubber temperature/rolling resistance.

In accordance with the present disclosure, a method for estimating driving range for a vehicle is provided. The method comprises, based on available driving energy for the vehicle, estimating distance to empty taking into account an estimated variation in rolling resistance of the vehicle for an upcoming driving event, wherein said estimated variation in rolling resistance of the vehicle is determined using a predetermined transient rolling resistance model into which transient tire temperature effects on rolling resistance are incorporated.

An estimation of a variation in rolling resistance of the vehicle for an upcoming driving event may comprise estimating a duration of a transient tire rubber temperature behavior, and thus of a transient rolling resistance. Such and estimation could comprise estimating an initial tire rubber temperature at the start of a planned upcoming driving event, or at the start of a portion of said planned upcoming driving event. Then, based on the estimated initial tire rubber temperature, ambient temperature and predicted driving conditions for the vehicle, an estimated duration until the tire rubber has reached a temperature equal to or above a predetermined temperature threshold. Such a threshold would preferably have some relation to a steady-state temperature under the given conditions.

One or more portions, e.g. a plurality of portions, of a planned driving event during which a transient tire temperature behavior of the vehicle may, e.g. is expected to, occur, could be identified. Such portions could be parts of the upcoming driving event having different speed requirements, and/or portions with a planned intermediate stop between them, and/or portions during which the vehicle carries different loads. A duration of transient tire rubber temperature behavior of the vehicle could be estimated for each of said one or more portions based on predicted driving conditions of the vehicle for the respective portions of the planned upcoming driving event. A rolling resistance for the upcoming driving event could then be predicted based on said estimated durations (for the portions), and a modelled rolling resistance for the duration of the transient tire temperature behavior for each of said one or more identified portions of the planned driving event. Such modelled rolling resistance may be e.g. an average rolling resistance coefficient for the duration derived based on the model. The model may take input in form of ambient temperature, tire rubber temperature at start of portion, estimated duration of transient tire rubber temperature behavior during each portion, and driving conditions during the respective portions.

Determining an estimated duration of transient tire rubber temperature behavior may comprise determining the estimated duration of transient tire rubber temperature based on stored reference data, such as a look-up table. The predicted driving conditions may suitably comprise at least vehicle speed and vehicle load.

A rolling resistance model may be a transient rolling resistance coefficient model, and may, as previously stated, take into account/be a function of ambient temperature and predicted or determined driving conditions for a vehicle, and further an estimated tire temperature at the initiation of the transient tire temperature behavior. The model may further take into account one or more parameters that may cause a cooling or warming effect of the tire during driving, such as rain, wet road conditions, humidity and/or braking.

A method implementing the teachings herein could be described as a method for transport planning. The method could comprise predicting a rolling resistance for each of a plurality of portions of a planned upcoming driving event, using a predetermined transient rolling resistance model into which transient tire rubber temperature effects on rolling resistance are incorporated, and further estimating a driving range for the vehicle, based on the predicted rolling resistance for the plurality of portions of the planned upcoming driving event, given an available driving energy for the vehicle, approving (e.g. executing, authorizing, allowing) or adjusting the planned upcoming driving event based on a relation between the estimated driving range and a range of the planned upcoming driving event.

According to a first exemplifying embodiment of the present disclosure, the predetermined transient rolling resistance model may calculate the time-dependent rolling resistance according to Equation 1:

$$C_{rr}(t) = k_1 * T^3_{tire-cir}(t) + k_2 * T^2_{tire-cir}(t) + k_3 * T_{tire-cir}(t) + k_4 \qquad \text{Eq. 1}$$

wherein $C_{rr}(t)$ represent the time-dependent rolling resistance, $T_{tire-cir}(t)$ represent time-dependent predicted rubber temperature of the tire at the circumferential portion of the tire, $k_1$, $k_2$, and $k_3$ each represents coefficients, and $k_4$ represents a constant.

The rubber temperature of the tire at the circumferential portion of the tire, at various points in time, may be predicted based on data relating to driving conditions of the vehicle, ambient temperature and potential external cooling effects. The driving conditions of the vehicle, such as vehicle speed and vehicle load, affect the loading/unloading of the tire and therefore the amount of heat dissipated due to hysteresis. Examples of external cooling effects include rain, wet road condition and aerodynamic cooling. Aerodynamic cooling of the tire often has a relatively low impact on the temperature at the circumferential portion of the tire and may therefore be neglected if desired. However, rain and/or a wet road condition may have a significant impact on the temperature of the tire at the circumferential portion thereof, and should therefore not be neglected if desiring a good accuracy of estimated driving range. The ambient temperature also has an effect on the temperature at the circumferential portion thereof, and should therefore also be taken into account.

At a point in time at which a planned driving event is to be initiated, i.e. $t=t_{start}$, the temperature of tire at the circumferential portion thereof may possibly be measured by means of a temperature sensor. However, it may in practice be very difficult to arrange a temperature sensor in the circumferential portion of the tire. Therefore, also the temperature in the circumferential portion of the tire at said point in time may be a predicted temperature. For example, if the vehicle has been at standstill for a long period of time, such as overnight, the current temperature at the circumferential portion of the tire may be estimated to correspond to the ambient temperature. Such a current temperature would thus correspond to the temperature at $t_{start}$. However, if the vehicle has for example be driven at a constant speed on a flat road for an extended period of time and without any changes in weather or road conditions immediately prior to $t_{start}$, the temperature at the circumferential portion of the tire may at $t_{start}$ be predicted to have reached a substantially steady-state temperature where there is a thermal balance between the heat dissipated in the tire and the surrounding conditions. Such a steady-state temperature may have been predetermined through experimental results. Yet another example includes a short stop of the vehicle which is not sufficiently long to cool down the tire temperature at the circumferential portion thereof to ambient temperature. In such a case, the temperature at $t_{start}$ (i.e. when the vehicle is to be brought in motion again) may be predicted taking into consideration the predicted tire temperature when the vehicle stopped and the cooling down of the tire temperature at the circumferential portion thereof resulting from the stop.

When the planned driving event comprises a plurality of portions, the transient rolling resistance model can be used to estimate the variation in rolling resistance during one or more, e.g. each, of said portions. Advantageously, the model could then be constructed to take into account an estimated/predicted temperature of the rubber of at least one tire of the vehicle at the beginning of such a portion, e.g. a point in time at which it is expected that the tire rubber temperature is about to start changing, or in other words, when a variation in tire rubber temperature is initiated/starts. Such a point in time is, for example, after an event, e.g. an intermediate stop, where the tire rubber temperature has cooled down, but not reached the ambient temperature, or at, e.g. right after, a change in vehicle speed. That is, $t_{start}$ could alternatively be a predicted temperature associated with a portion of a planned upcoming driving event.

In view of the foregoing, it is clear that the transient rolling resistance model represented by Equation 1 above takes into account ambient temperature, one or more parameters causing cooling of the tire during driving (such as rain, wet road condition and/or aerodynamic cooling), driving conditions of the vehicle (such as vehicle speed). Furthermore, it takes into account an estimated transient temperature of the tires determined based on predicted driving conditions of the vehicle in view of taking into account the time-dependent predicted temperature of the tire at the circumferential portion of the tire. Moreover, it takes into account a predicted or measured initial temperature of the tire at a start of a planned driving event or a portion thereof.

It should further be noted that the coefficients, $k_1$, $k_2$, $k_3$ and $k_4$, of Equation 1 above may be dependent of ambient temperature and vehicle speed.

According to a second exemplifying embodiment of the present disclosure, the predetermined transient rolling resistance model may be adapted to calculate a time-dependent adjusted rolling resistance coefficient based on a predetermined rolling resistance coefficient determined according to a standardized procedure. The predetermined rolling resistance coefficient may for example be determined according to ISO 28580:2009. By fitting the transient rolling resistance model described according to Equation 1 to predetermined rolling resistance coefficient(s) determined according to standardized procedures, the accuracy of estimation of rolling resistance may be further improved. This in turn further improves the accuracy in the estimated driving range.

The performance of the herein described method for estimating driving range for a vehicle may be governed by programmed instructions. These programmed instructions typically take the form of a computer program which, when executed in or by a control device, cause the control device to effect desired forms of control action. Such instructions may typically be stored on a computer-readable medium.

The present disclosure further relates to a control device configured to estimate driving range for a vehicle in accordance with the method described above. The control device may be configured to perform any one of the steps of the method for estimating driving range for a vehicle as described herein.

More specifically, in accordance with the present disclosure a control device configured to estimate driving range for a vehicle is provided. The control device is configured to, based on available driving energy for the vehicle, estimate driving range taking into account an estimated variation in rolling resistance of the vehicle, wherein the estimated variation in rolling resistance of the vehicle is determined using a predetermined transient rolling resistance model into which transient tire temperature effects on rolling resistance are incorporated.

The control device may further be configured to determine available driving energy for the vehicle, or communicate with another control system, for example a battery management system, for the purpose of obtaining information regarding available driving energy for the vehicle.

Moreover, the control device may be configured to communicate with one or more other controllers and/or sensors of the vehicle or associated therewith for the purpose of obtaining data for the purpose of performing the herein described method. Alternatively, or additionally, the control device may be configured to determine data to be used for the purpose of performing the herein described method.

The control device may comprise one or more control units. In case of the control device comprising a plurality of control units, each control unit may be configured to control a certain function or a certain function may be divided between more than one control units.

The control device may be a control device arranged onboard the vehicle, or a control device arranged remote from the vehicle. If arranged remote from the vehicle, the control device may be configured to communicate with one or more vehicle controllers arranged onboard the vehicle, for example in order to present information to a driver of the vehicle or to control the vehicle. Alternatively, parts of the control device may, if desired, be arranged remote from the vehicle. For example, one or more control units of the control device may be arranged at a remote control center and configured to communicate with one or more control units of the control device arranged on board the vehicle.

FIG. 1 schematically illustrates a side view of an example of a vehicle 1. The vehicle may be a fully electric vehicle or a hybrid vehicle. Furthermore, the vehicle may be a heavy vehicle, such as a bus or a truck, but is not limited thereto. The vehicle 1 comprises a first propulsion unit in the form of an electric motor 2. The electric motor 2 is powered by an energy storage device 3 of the vehicle. The vehicle 1 may comprise a second propulsion unit, such as a combustion engine 5 and/or a second electric motor (not shown), if desired. The electric motor 2 may further be operated as a generator, for example during regenerative braking of the vehicle, and thereby charging the energy storage device. The vehicle 1 may further comprise a gearbox 4 configured to selectively transfer propulsion torque from the propulsion unit(s) to the driving wheels 7 of the vehicle.

The vehicle 1 may further comprise a control device 100 configured to estimate driving range. The control device 100 may be configured to communicate with a remote control center, control devices of other vehicles, and/or control units of the infrastructure, via any previously known communication system therefore, for the purpose of exchanging various forms of data. Examples of such data may comprise data for positioning of the vehicle and/or map data (including topographic data), data regarding speed limits, traffic data (such as potential queuing or the like), and/or meteorological data.

Figure 2:
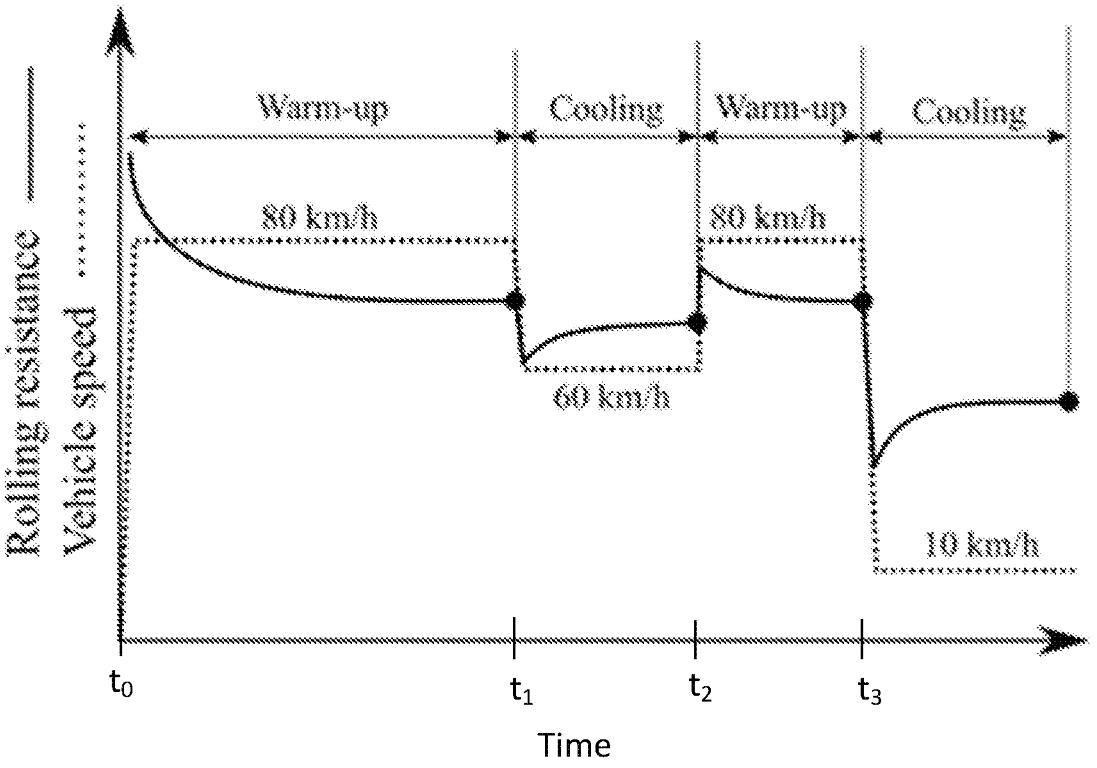
FIG. 2 schematically illustrates an example of a change in rolling resistance over time as a result of change in vehicle speed.

FIG. 2 schematically illustrates an example of a change in rolling resistance for a vehicle, such as the vehicle shown in FIG. 1, over time as a result of change in vehicle speed. For ease of illustration, it is here assumed that there is no change in ambient temperature over time and that there are no external cooling effects, such as rain and/or wet road, during the driving event. In the figure, the vehicle starts driving at to and the speed is quickly increased to 80 km/h. The tire temperature at to is here assumed to essentially correspond to the ambient temperature. The vehicle speed is thereafter changed to 60 km/h at $t_1$ and back to 80 km/h at $t_2$. At $t_3$, the vehicle speed is changed to 10 km/h. For the purpose of this illustration, it is here assumed that a thermal balance between dissipation of heat from the rubber and temperature effects from the surrounding environment is reached at or shortly before $t_1$, $t_2$, and $t_3$, respectively. It should however be noted that this may not necessarily occur during realistic driving conditions where said thermal balance may be difficult to reach.

As can be seen from FIG. 2, the rolling resistance decreases during the period from $t_0$ to $t_1$. This a result of dissipation of energy during loading/unloading of the rubber causing a warm-up of the tire temperature as described above. Although the tire temperature has increased from $t_0$ to $t_1$, the reduction of vehicle speed at $t_1$ results in a drop of rolling resistance resulting from the change in vehicle speed causing a lower frequency of the loading/unloading of the rubber. Driving at the lower speed of 60 km/h also causes a cooling of the tire temperature, compared to the tire temperature reached at $t_1$, because of the lower frequency of the loading/unloading of the rubber. In other words, there is no longer a thermal balance when the vehicle speed is changed at $t_1$. This in turn will result in an increase in rolling resistance during the period of driving at 60 km/h, i.e. between $t_1$ and $t_2$, until a thermal balance has been reached again (here assumed to be reached at or shortly before $t_2$). At $t_2$, when the vehicle speed is increased to 80 km/h, there is an increase in rolling resistance resulting from the increase vehicle speed leading to an increased frequency of the loading/unloading of the rubber. This increased vehicle speed will also over time result in an increase in the tire temperature due to higher dissipation of energy, and the rolling resistance therefore decreases between $t_2$ and $t_3$ until thermal balance has been reached again. The change in vehicle speed at $t_3$ will result in a drop in rolling resistance resulting from the change of vehicle speed causing a lower frequency of loading/unloading the rubber. The change in vehicle speed will therefore also result in less dissipation of heat which may heat up the tire and therefore a cooling effect on the tire temperature. This means that rolling resistance increases over time after $t_3$, as shown in the figure.

FIG. 3 represents a flowchart schematically illustrating one exemplifying embodiment of the method for estimating a driving range for a vehicle according to the present disclosure. The method comprises a step S120 of, based on available driving energy for the vehicle, estimating driving range taking into account an estimated variation in rolling resistance of the vehicle. Said estimated variation in rolling resistance of the vehicle is determined using a predetermined transient rolling resistance model into which transient tire temperature effects on rolling resistance are incorporated.

FIG. 4 schematically illustrates an exemplifying embodiment of a device 500. The control device 100 described above may for example comprise the device 500, consist of the device 500, or be comprised in the device 500.

The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer program P that comprises instructions estimating a driving range for a vehicle. The computer program comprises instructions for, based on available driving energy for the vehicle, estimating driving range taking into account an estimated variation in rolling resistance of the vehicle, wherein the estimated variation in rolling resistance of the vehicle is determined using a predetermined transient rolling resistance model into which transient tire temperature effects on rolling resistance are incorporated.

The program P may be stored in an executable form or in a compressed form in a memory 560 and/or in a read/write memory 550.

The data processing unit 510 may perform one or more functions, i.e. the data processing unit 510 may affect a certain part of the program P stored in the memory 560 or a certain part of the program P stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicate with the data processing unit 510 via a data bus 514. The communication between the constituent components may be implemented by a communication link. A communication link may be a physical connection such as an optoelectronic communication line, or a non-physical connection such as a wireless connection, e.g. a radio link or microwave link.

When data are received on the data port 599, they may be stored temporarily in the second memory element 540. When input data received have been temporarily stored, the data processing unit 510 is prepared to effect code execution as described above.

Parts of the methods herein described may be affected by the device 500 by means of the data processing unit 510 which runs the program stored in the memory 560 or the read/write memory 550. When the device 500 runs the program, methods herein described are executed.

In the following, rolling resistance tests will be described for the purpose of demonstrating the temperature effect on rolling resistance for a heavy vehicle.

For the purpose of clarifying the various portions of a tire as discussed herein, FIG. 5 schematically illustrates a cross-sectional view of a tire 20. The tire 20 has a crown 21 and a shoulder 22. The shoulder is the area where the thread and sidewall 23 of the tire meet. The crown 21 and the shoulder 22 together form a circumferential portion of the tire and are configured to face towards a road surface. The tire 20 further comprises an apex 24. The apex 24 is not in contact with the road surface but arranged closer to the wheel rim (not shown).

The rolling resistance tests were conducted at Scania's climate wind tunnel where the ambient temperature can be altered. The measurement drum has a diameter of 2.5 m, which is 0.5 m larger than the recommended diameter in the ISO 28580:2009 standard. The usage of the larger drum than according to the standard has the advantage of causing less warming up of the tires and better mimics a flat road. If the drum diameter is too small, the tire temperature becomes too high, and the measurement results might become less relevant. Approximation equations to convert drum measurements to flat road results are commonly known. However, in the present disclosure, the measurements given are direct drum tests where no conversion equations were used.

The wind and drum speed were set to 80 km/h and the tests were conducted at four different ambient temperatures, namely +25° C., +5° C., −15° C., and −30° C. To make it relevant to measure the tire in such a large temperature range, the chosen tire has a Mud+Snow (M+S) and Three Peak Mountain Snow Flake (3PMSF) marking for winter usage. Dual tires were used on the measured axle. The measured tires had a 5.1 kg/ton labelled rolling resistance value (class C rolling resistance (EU, 2009)).

Before the tests, the tires were preconditioned by driving them 1500 km using 10 500 kg axle load and 8.5 bar inflation pressure. The reason for said preconditioning was that the measurements would show the actual rolling resistance instead of evaluating the reduction of rolling resistance because of strain-softening in new tires. To measure the tire temperature, the tires were equipped with K-type thermocouples. These K-type thermocouples were glued into drilled holes located at the tire shoulder and near the apex, respectively. In order to ensure that the tires had a substantially homogenous and known temperature at the start of the tests, the tires were kept in the measurement temperature (i.e. the different ambient temperatures) for at least 12 hours before starting the tests.

To separate tire rolling resistance from the gearbox and differential losses, the drive shafts were removed during the tests. Moreover, before the start of every test, the truck was lifted with an overhead crane and the drum was driven for 30 minutes (at 80 km/h) to warm up the drum bearings and stabilize the force measurement. The last averaged value of the drum rolling loss was subtracted afterwards from the rolling resistance measurements to remove most of the parasitic losses from the drum bearings. After this, the drive axle was lowered on the drum so that the tires were barely touching the drum and driven for 15 minutes. This step was done to warm up the wheel bearings. Finally, the tire pressure was adjusted to 8.5 bar, the axle was lowered on the drums and 10.2 tons axle load was applied on the drive axle. These steps were repeated in all of the measurement temperatures. This means that the measured rolling resistance includes the losses from the wheel bearings and the aerodynamic resistance of the tires. The effects of these are however estimated to be considerably lower than the rolling resistance caused by the viscoelastic effects.

The change of rolling resistance in wet driving conditions was measured by spraying water on the tires. During the rain/wet tests, 0.2 l/s water was sprayed to the left tires at 80 km/h vehicle speed. Here, the hydrodynamic effects (i.e. pumping of a water layer away from the contact patch) are considered to be close to zero because of the relatively low amount of water spraying and the usage of the outer drum measurements where the water layer build-up is less likely than if using flat surface measurements.

Figure 6:
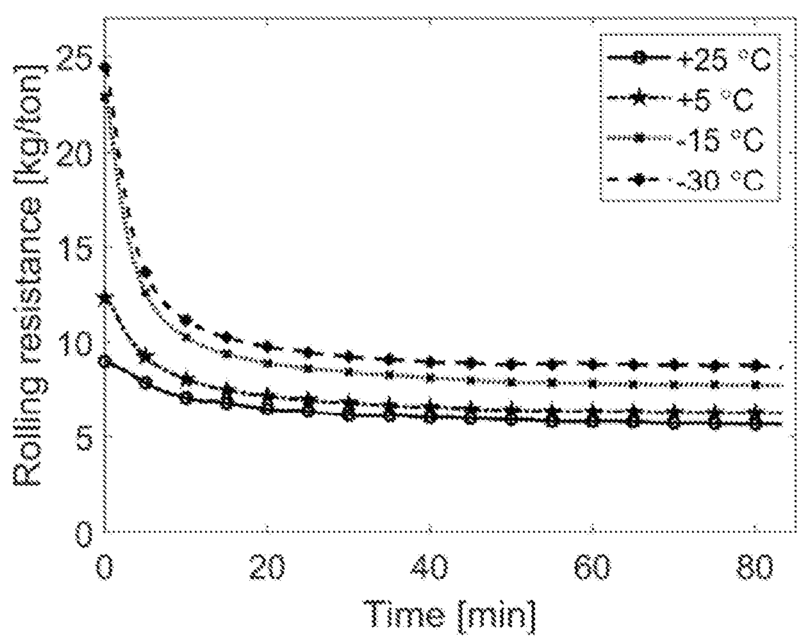
FIG. 6 illustrates rolling resistance measurements plotted over time at different ambient temperatures as derived through experimental tests.

FIG. 6 illustrates rolling resistance plotted over time at different ambient temperatures according to the dry test. From the results, it can be seen that the transient rolling resistance starts with a higher value and reaches a lower, stabilized, rolling resistance roughly after 45-80 minutes. Furthermore, it is shown that, with decreasing ambient temperature, the rolling resistance increases. The (measured) rolling resistance is hereafter also denominated $C_{rr}$.

Figure 7:
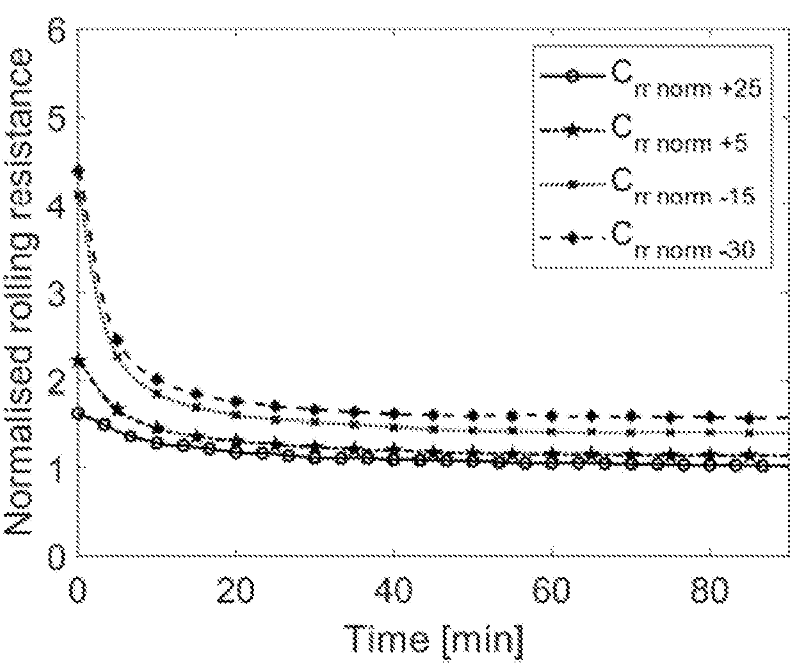
FIG. 7 shows the rolling resistance measurements normalized with the measured stabilized $C_{rr}$ value at +25° C.

FIG. 7 shows the rolling resistance measurements normalized with the measured stabilized Cry value at +25° C. It has been found that, at −15° C. and −30° C., the initial rolling resistance is over four times the stabilized rolling resistance at +25° C. At −30° C., the stabilized rolling resistance is approximately 1.65 larger compared to the values at +25° C.

Figure 8:
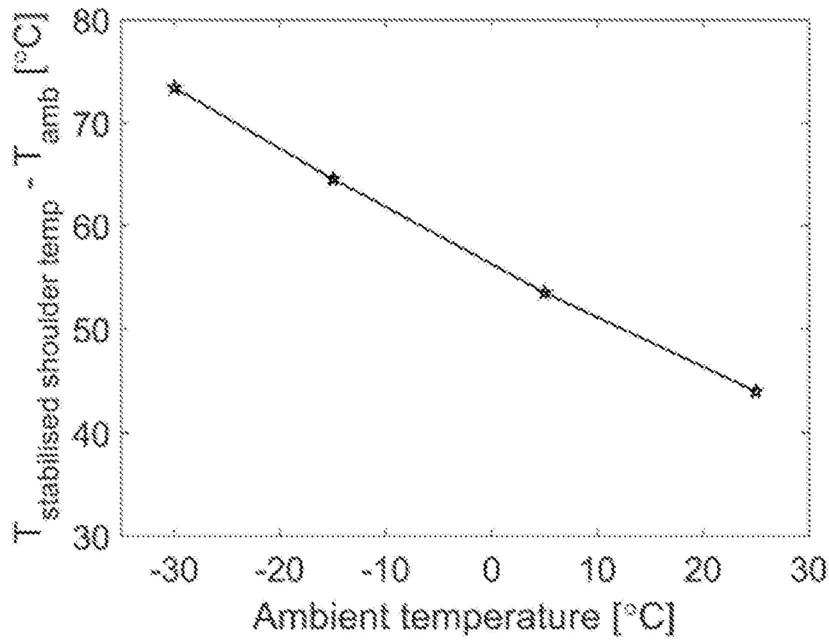
FIG. 8 illustrates stabilized difference between ambient temperature and tire temperature over different ambient temperatures.
Figure 9:
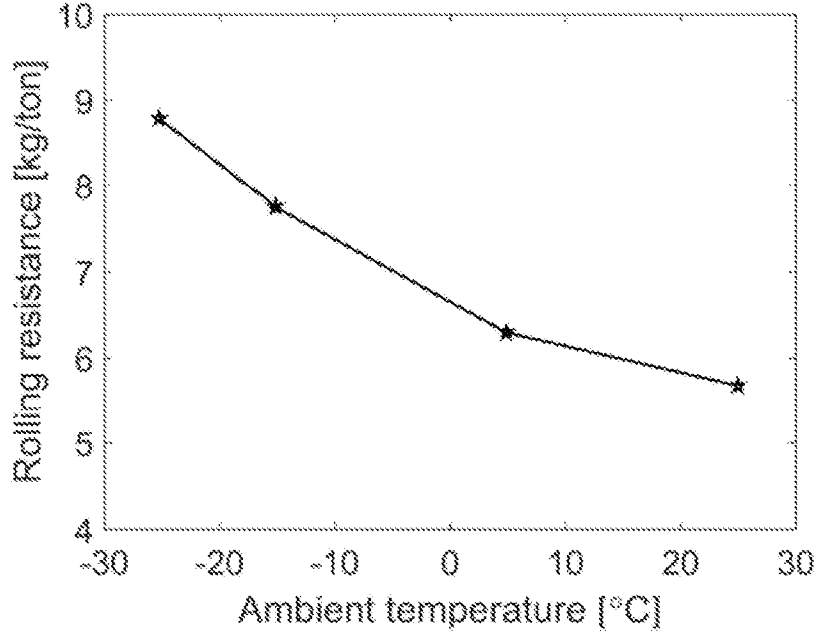
FIG. 9 illustrates stabilized rolling resistance plotted over different ambient temperatures.

The temperature difference between the stabilized tire shoulder temperature ($T_{stabilised\ shoulder\ temp}$) and ambient temperature ($T_{amb}$) has a linear relationship with ambient temperature, as shown in FIG. 8, while the stabilized rolling resistance as a function of ambient temperature has a non-linear relationship, as shown in FIG. 9. An increase in tire temperature during driving directly indicates that the tires dissipate a larger amount of energy.

Figure 10:
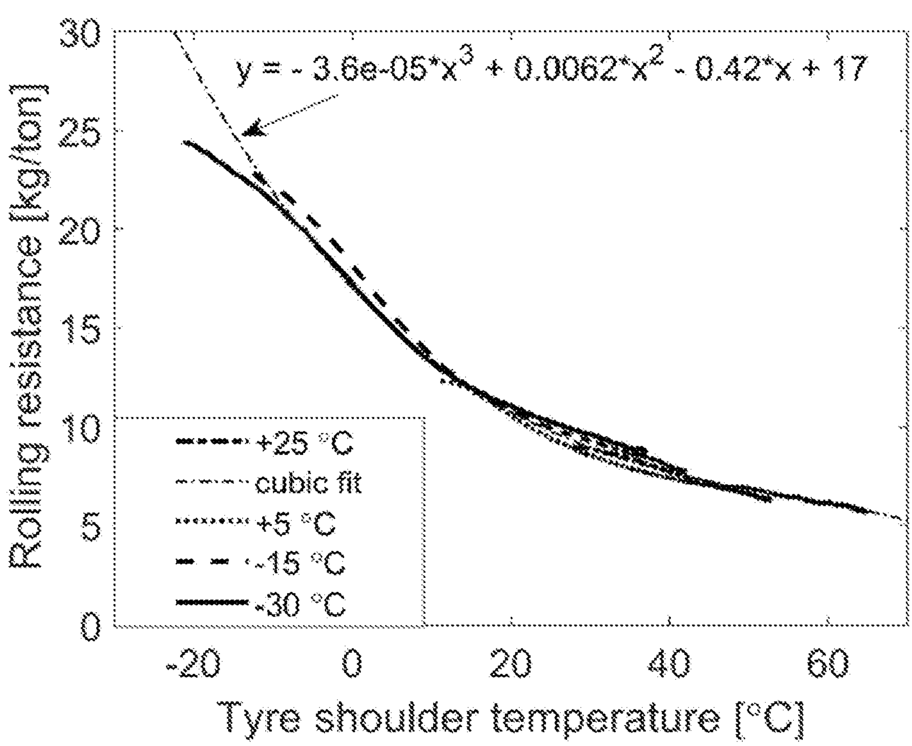
FIG. 10 illustrates the rolling resistance plotted over tire temperature at the tire shoulder at various ambient temperatures.
Figure 11:
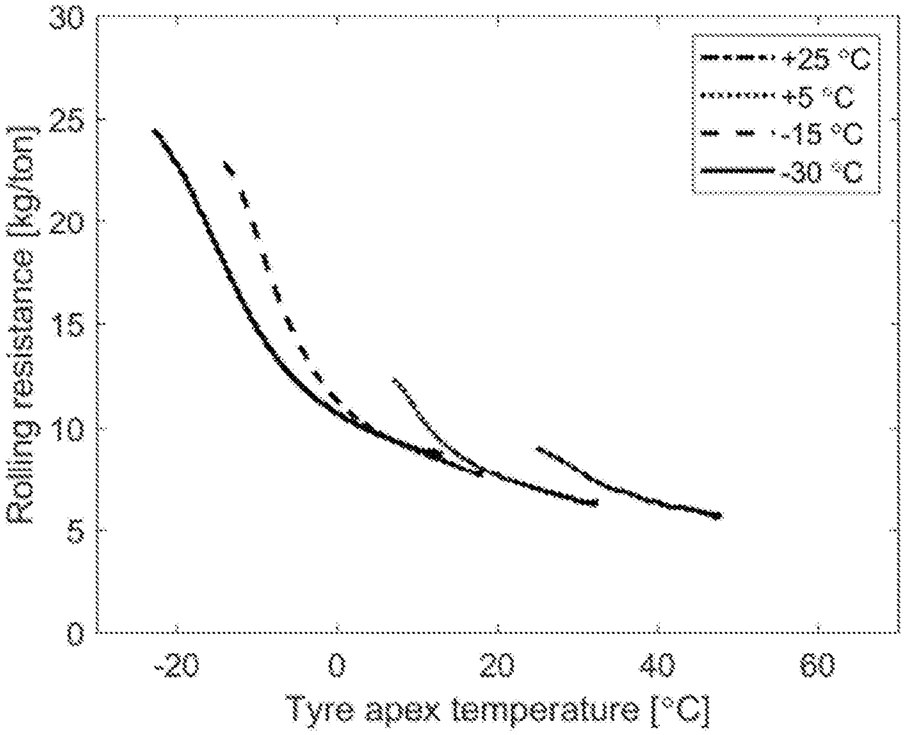
FIG. 11 illustrates rolling resistance plotted over tire temperature at the apex of the tire.

FIG. 10 illustrates the rolling resistance plotted over tire temperature at the tire shoulder at various ambient temperatures, and FIG. 11 illustrates the rolling resistance plotted over tire temperature at the apex. These figures demonstrate that rolling resistance seems to have a strong correlation with the tire shoulder temperature. However, temperature measurements near the apex seem to be a less relevant indicator for the rolling resistance.

Based on the results shown in FIG. 10, it has been found that it is possible to approximate the rolling resistance Cry as a function of tire temperature $T_{tire\text{-}cir}$ at a circumferential portion of the tire (such as the tire shoulder temperature according to the measurements) using a cubic function according to Equation 2 (compare with Equation 1 given above).

$$C_{rr} = k_1 * T_{tire-cir}^3 + k_2 * T_{tire-cir}^2 + k_3 * T_{tire-cir} + k_4 \qquad \text{Eq. 2}$$

where $k_1$, $k_2$, and $k_3$ each represents coefficients and $k_4$ represents a constant. Although the coefficients and the constant would vary, Equation 2 is believed to be applicable to all pneumatic tires, or at least pneumatic tires with filler reinforced rubber. For the specific results shown in FIGS. 10, $k_1$=−3.6e−05, $k_2$=0.0062, $k_3$=0.42, and $k_4$=17 as also illustrated in the figure.

Figure 12:
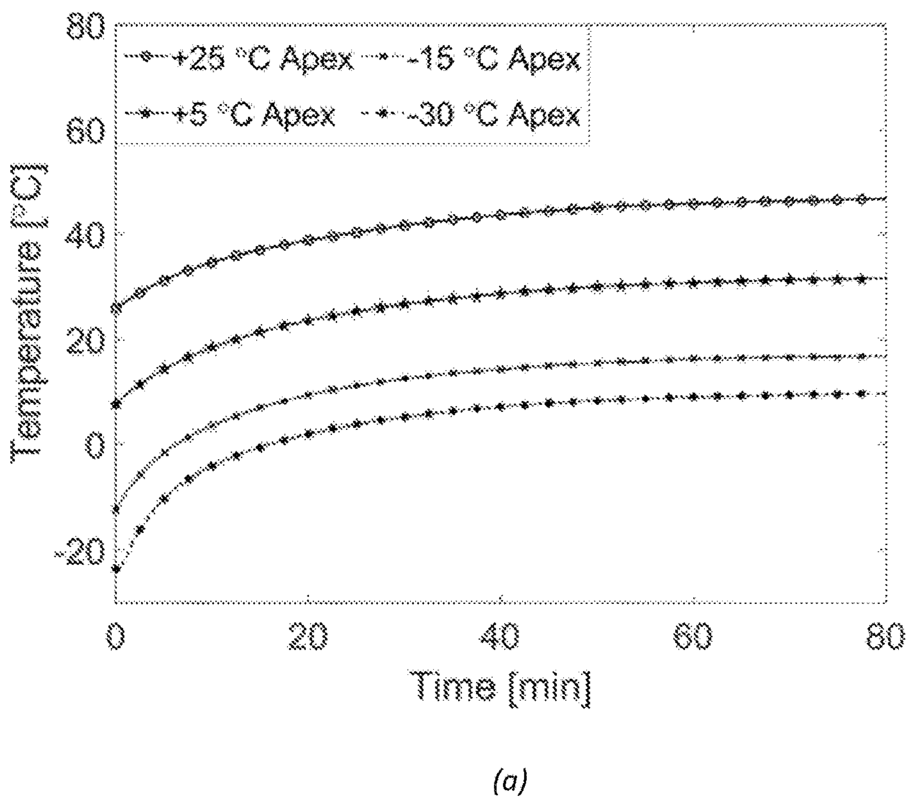
FIG. 12 illustrates the temperature warm up at (a) the tire apex and (b) the tire shoulder.
Figure 12:
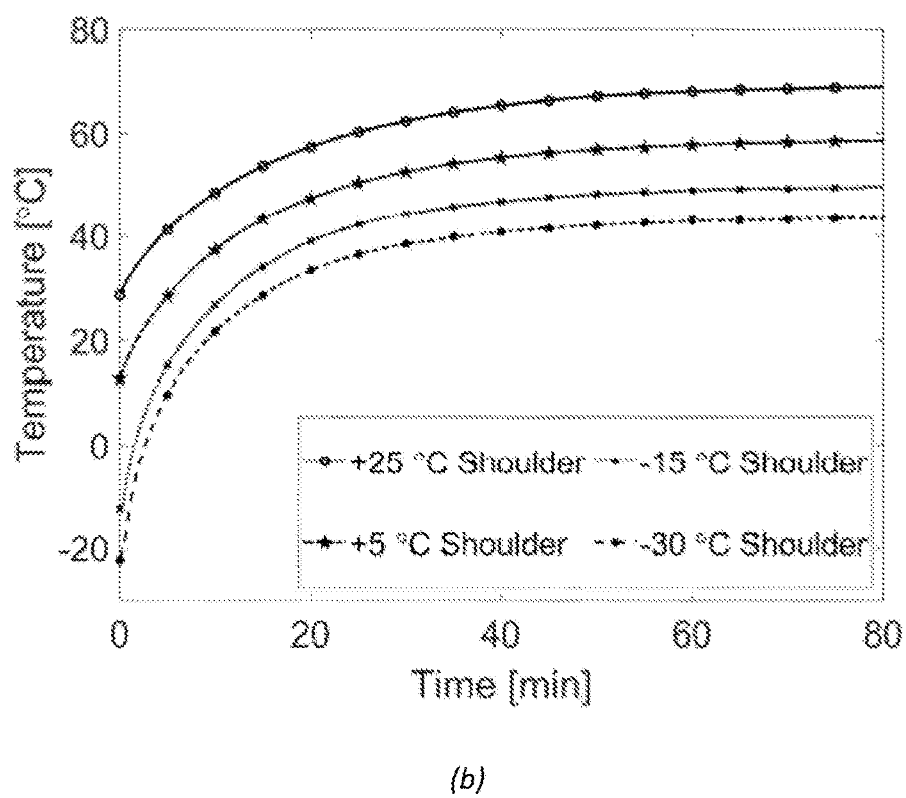
Figure 13:
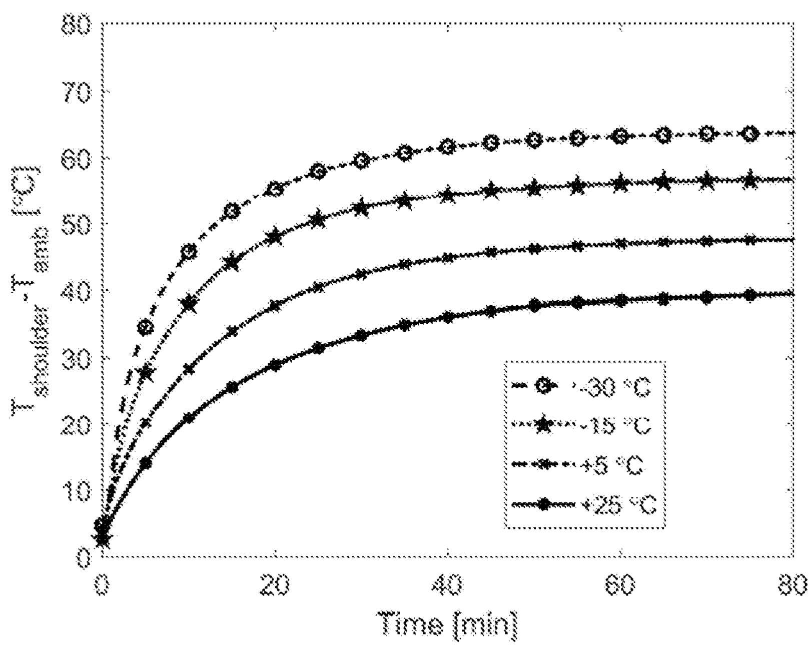
FIG. 13 illustrates difference between tire shoulder temperature and ambient temperature plotted over time.

FIG. 12(*a*) illustrates the temperature warm up at the tire apex and FIG. 12(*b*) illustrates the temperature warm up at the tire shoulder. It can be clearly seen that the shoulder measurements reach higher temperatures than the apex measurements. Moreover, the apex temperatures reach a substantially steady temperature slower compared to the tire shoulder temperatures. Furthermore, not only does the tire temperature converge to a lower temperature when the ambient temperature decreases, as shown in FIG. 12, but also the differences between the tire shoulder temperature and ambient temperature increase with the decreasing ambient temperatures. This is shown in FIG. 13. This is an indicator that more energy must be put into the tire to heat up a large mass of rubber with a certain type of heat capacity up to a higher temperature difference between the tire and ambient temperature.

According to one alternative, the transient part of the rolling resistance could be presented as an average rolling resistance over a certain drive time at different temperatures, which in some cases could be a more meaningful value to compare in range calculations without actually modelling the transient rolling resistance at every instance. To get a more representative value of the rolling resistance for a given drive event, an averaged rolling resistance over a certain drive time, $C_{rr\_AVG}(t)$, is proposed according to Equation 3, where $t_{drive\_time}$ is the duration of the drive event.

$$C_{rr\_AVG}(t) = \frac{1}{t_{drive\_time}} \int_{t=o}^{t_{drive\_time}} C_{rr}(t)dt \qquad \text{Eq. 3}$$

Figure 14:
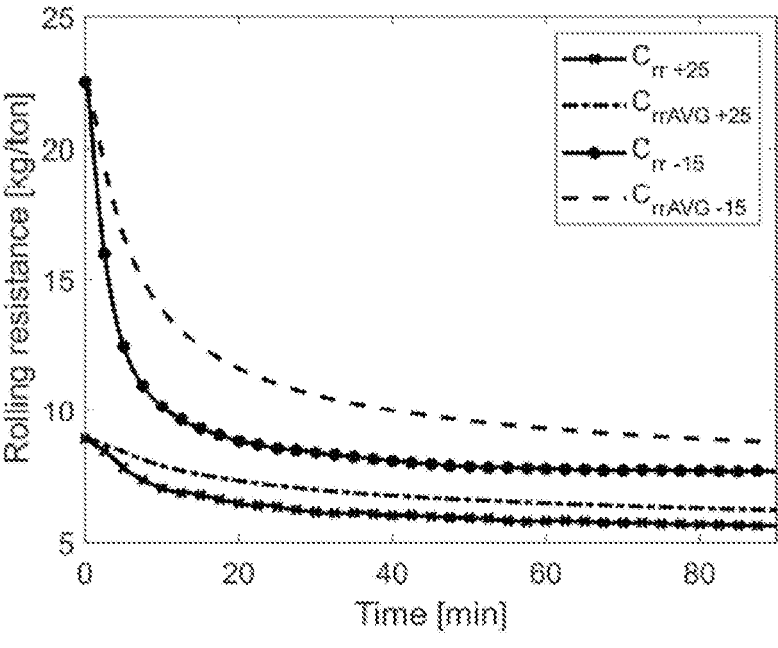
FIG. 14 illustrates actual rolling resistance and averaged rolling resistance for a given drive time at different ambient temperatures.

An averaged rolling resistance plot gives an insight into the real-life rolling resistance at different drive times. FIG. 14 shows both the actual and averaged rolling resistance $C_{rr\_AVG}$ for a given drive time at different ambient temperatures, more specifically at −15° C. and +25° C., respectively. It can be seen that, as an example, when driving 50 minutes at −15° C., the average rolling resistance would be about 1.75 kg/ton higher than the current $C_{rr}(t)$ value. The proposed average rolling resistance plots can be extracted with commonly used testing methods used according to the ISO 28580:2009 EU labelling (except for the coast-down method).

Figure 15:
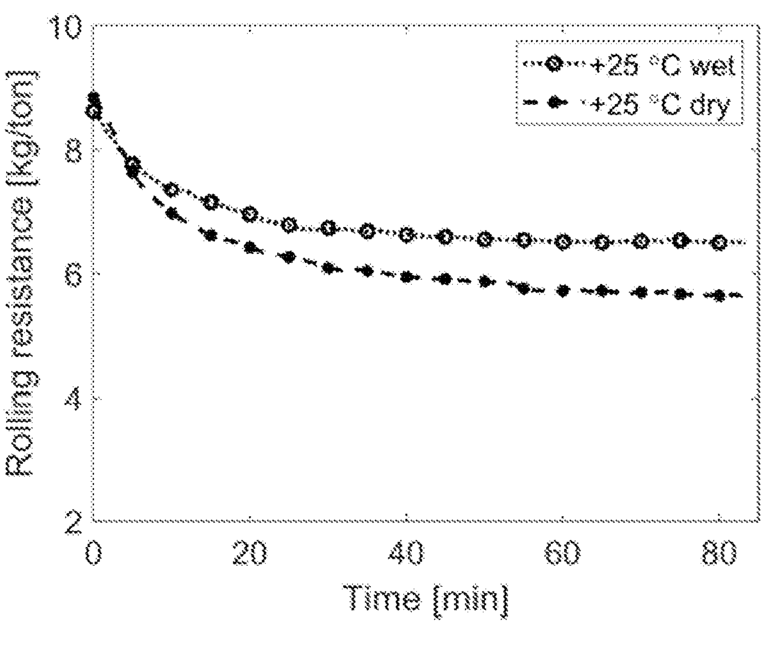
FIG. 15 illustrates rolling resistance results with dry and wet driving conditions plotted over time.

FIG. 15 illustrates rolling resistance results with dry and wet driving conditions at ambient temperature +25° C. plotted over time. It can be seen that the tests start from a similar rolling resistance, but the dry measurements converge into approximately 15% lower rolling resistance than the wet measurements. The fact that both rolling resistance measurements start from similar values indicates that there is not enough water spraying to generate a water layer that the tire has to pump away from the contact surface of the tire. Therefore, it can be concluded that most of the increase in rolling resistance in this test is due to lower tire temperature caused by the wet driving conditions.

Furthermore, to illustrate the importance of considering variation of rolling resistance in range estimations, simulations were conducted comparing the range of a hypothetical long haulage battery electric truck (BET) driving at a constant velocity of 80 km/h at different ambient temperatures ($T_{amb}$). The following values are chosen for the range calculation: the battery size ($W_{bat}$) is 600 kWh, the state of charge window ($d_{SOC}$) is 80% (useable battery capacity), battery and the total powertrain efficiency ($\eta_{pt}$) is 0.94, the aerodynamic drag coefficient (Ca) is 0.5 and the cross-sectional area of the vehicle front (A) is 10 $m^2$. For simplification, it is assumed that the vehicle has the same tires at every axle with the same rolling resistance coefficient. Furthermore, a vehicle weight ($m_{truck}$) of 40 tons is used in the simulations. The average rolling resistance after driving 155 min ($C_{rr\_AVG}$) (determined according to Equation 2 above) used in the simulations was 5.9 kg/ton at +25° C., 6.6 kg/ton at +5° C., 8.3 kg/ton at −15° C., and 9.3 kg/ton at −30° C. The force opposing the vehicle motion is calculated according to Equation 4.

$$F_r = C_{rr\_AVG}(T_{amb})m_{truck}g + \frac{1}{2}\rho_{air}(T_{amb}, \Phi)C_d AV^2 + m_{truck}\frac{dV}{dt} + m_{truck}g\sin\alpha + \frac{P_{int}}{V} \quad \text{Eq. 4}$$

where average rolling resistance $C_{rr\_AVG}$ is a function of ambient temperature $T_{amb}$, the density of air $\rho_{air}$ is a function of both ambient temperature $T_{amb}$ and relative air humidity $\Phi$, g is the gravitational acceleration and V is the vehicle velocity. For simplicity, it here is assumed that the inclination of the road $\alpha$ and internal and accessory losses $P_{int}$ are zero. The vehicle is driving in a long haulage application, which is why acceleration losses can be assumed to be near zero also. Both air density and rolling resistance are varied respective temperatures. Dry air density is calculated according to Equation 5, where p represents pressure and $R_{specific}$ is the mass-specific gas constant.

$$\rho(T_{amb}) = \frac{p}{R_{specific}T_{amb}}, \left(R_{specific} = 287.058\ \frac{\text{J}}{\text{kg}K}\right) \quad \text{Eq. 5}$$

Calculations and coefficients for the humid air are done using the method shown in Davis, R. S. (1992) 'Equation for the determination of the density of moist air (1981/91)', Metrologia, 29, pp. 67-70, doi: 10.1088/0026-1394/29/1/008.

The needed propulsion power $P_r$ for the vehicle is calculated according to Equation 6 and the resulting range $S_{range}$ is calculated according to Equation 7.

$$P_r = \frac{F_r V}{\eta_{pt}} \quad \text{Eq. 6}$$

$$S_{range} = \frac{d_{SOC}W_{bat}V}{P_r} \quad \text{Eq. 7}$$

Figure 16:
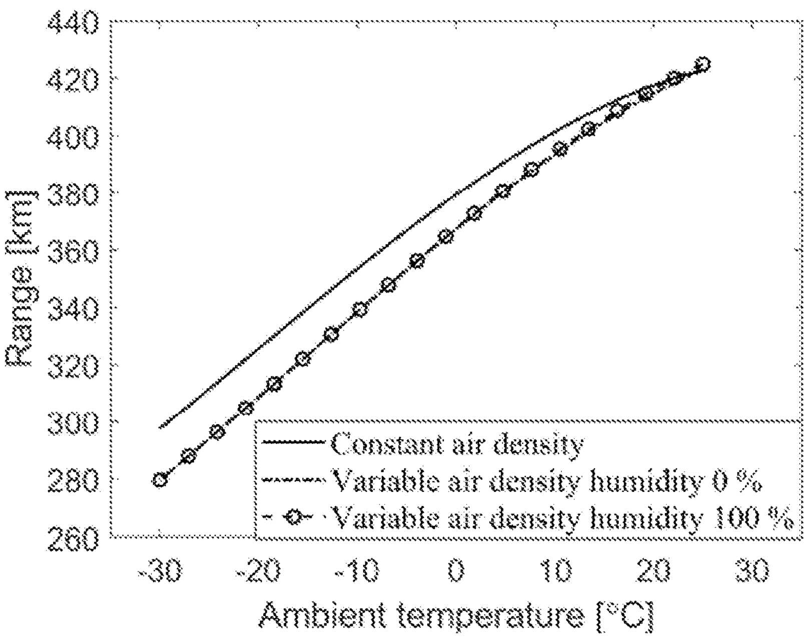
FIG. 16 illustrates simulated BET driving range when rolling resistance and air density is varied with 0% and 100% relative air humidity.

FIG. 16 illustrates the effect of different ambient temperatures on the simulated BET range because of the change in rolling resistance according to the above-described average rolling resistance values (after driving 155 min). The largest change is because of the change in rolling resistance (solid line). The change of air density also plays some role for the range (dashed line), but there seems to be only marginal difference between zero relative humidity and 100% relative humidity (dashed line with circles).

Furthermore, it can be clearly seen that the range drops significantly with decreasing temperature. At a very cold temperature, −30° C., the range has dropped approximately 29% from the range at +25° C. ambient temperature only because of the rolling resistance. When both rolling resistance and aerodynamic resistance is varied, the decrease in range is 34%.

Figure 17:
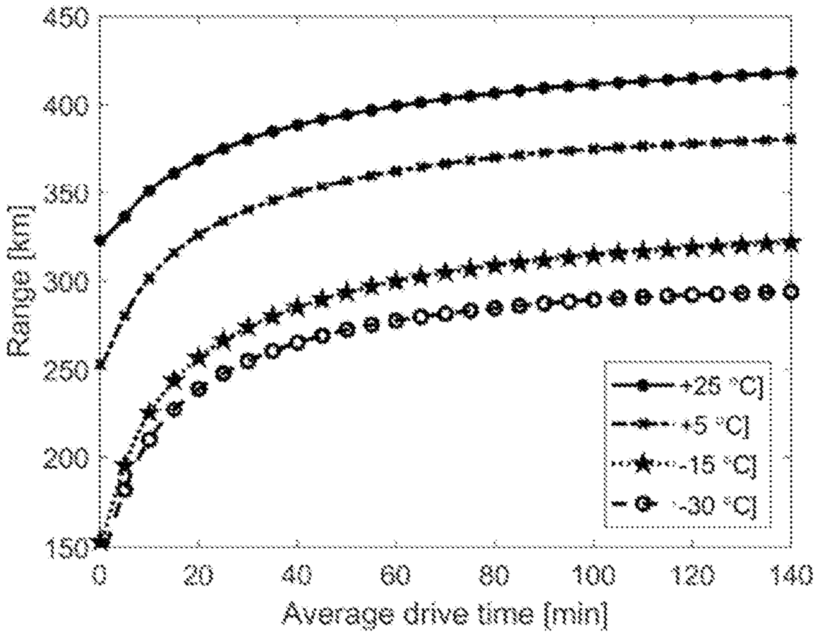
FIG. 17 illustrates range calculations with varying drive time at different ambient temperatures.

FIG. 17 depicts the range that the vehicle can cover with different lengths of driving trips, where the averaged rolling resistance varies depending on the drive time=X. As an example, if all the trips are only 20 minutes long (X=20) and the tires always have time to cool down fully during the stops, the vehicle could cover approximately 325 km distance at +5° C. If the trips would be 160 minutes long at the same temperature the vehicle would have a 380 km range. This is a very important finding, which could be very valuable when planning routes including stops for e.g. commercial heavy vehicles. In regard of a planned upcoming driving event, each X minute trip or drive, here exemplified with X=20, could be what is earlier referred to as a portion of the planned upcoming driving event. The different portions of a driving event could, however, each have a different duration and/or length.

The invention claimed is:

1. A method, performed by a control device, for estimating a driving range for a vehicle, the method comprising:

based on available driving energy for the vehicle, estimating the driving range taking into account an estimated variation in rolling resistance of the vehicle, wherein the estimated variation in rolling resistance of the vehicle is determined using a predetermined transient rolling resistance model into which transient tire rubber temperature effects on rolling resistance are incorporated, wherein the transient tire rubber temperature used in the model is a tire rubber temperature of at least a portion of the tire that face towards a road surface; and approving or adjusting the planned upcoming driving event in dependence of whether the estimated driving range is determined to be sufficient or not for completing the planned upcoming driving event.

2. The method according to claim 1, wherein the predetermined transient rolling resistance model takes into account ambient temperature.

3. The method according to claim 1, wherein the predetermined transient rolling resistance model takes into account at least one parameter causing cooling of the tire during driving of the vehicle.

4. The method according to claim 3, wherein at least one parameter causing cooling of the tire during driving comprises rain, wet road condition and/or aerodynamic cooling.

5. The method according to claim 1, wherein the predetermined transient rolling resistant model takes into account vehicle speed.

6. The method according to claim 1, wherein the predetermined transient rolling resistance model takes into account an estimated transient temperature of the tires determined based on predicted driving conditions of the vehicle.

7. The method according to claim 1, wherein the predetermined transient rolling resistance model takes into account a predicted or measured initial temperature of the tire rubber at a start of a planned driving event, and/or a predicted temperature of the tire rubber at the start of a portion of the planned upcoming driving event.

8. The method according to claim 1, wherein the predetermined transient rolling resistance model is adapted to calculate a time-dependent adjusted rolling resistance coefficient based on a predetermined rolling resistance coefficient determined according to a standardized procedure.

9. The method of claim 1, wherein the estimation of a variation in rolling resistance of the vehicle for an upcoming driving event comprises estimating a duration of a transient tire rubber temperature behavior.

10. The method of claim 9 further comprising estimating the duration of transient tire rubber temperature behavior based on predicted driving conditions of the vehicle for one or more portions of the planned upcoming driving event.

11. The method according to claim 1, the portion of the tire that faces towards the road surface comprises a crown and a shoulder of the tire.

12. A method, performed by a control device, the method comprising:

estimating a driving range for a vehicle for a planned upcoming driving event, said estimating comprising:

based on available driving energy for the vehicle, estimating the driving range taking into account an estimated variation in rolling resistance of the vehicle, wherein the estimated variation in rolling resistance of the vehicle is determined using a predetermined transient rolling resistance model into which transient tire rubber temperature effects on rolling resistance are incorporated, wherein the transient tire rubber temperature used in the model is a tire rubber temperature of at least a portion of the tire that face towards a road surface; and approving or adjusting the planned upcoming driving event in dependence of whether the estimated driving range is determined to be sufficient or not for completing the planned upcoming driving event.

13. The method according to claim 12, wherein the upcoming driving event comprises a plurality of portions, each being associated with a variation in tire rubber temperature.

14. The method according to claim 12, wherein the planned upcoming driving event comprises at least one planned stop.

15. A computer program product stored on a non-transitory computer-readable medium, said computer program product for estimating a driving range for a vehicle, wherein said computer program product comprising computer instructions to cause one or more computing devices to perform the following operations:

based on available driving energy for the vehicle, estimating the driving range taking into account an estimated variation in rolling resistance of the vehicle, wherein the estimated variation in rolling resistance of the vehicle is determined using a predetermined transient rolling resistance model into which transient tire rubber temperature effects on rolling resistance are incorporated, wherein the transient tire rubber temperature used in the model is a tire rubber temperature of at least a portion of the tire that face towards a road surface; and approving or adjusting the planned upcoming driving event in dependence of whether the estimated driving range is determined to be sufficient or not for completing the planned upcoming driving event.

16. The computer program product according to claim 15, wherein the predetermined transient rolling resistance model takes into account ambient temperature.

17. The computer program product according to claim 15, wherein the predetermined transient rolling resistance model takes into account at least one parameter causing cooling of the tire during driving of the vehicle.

18. The computer program product according to claim 15, wherein the predetermined transient rolling resistant model takes into account vehicle speed.

19. The computer program product according to claim 15, wherein the predetermined transient rolling resistance model takes into account an estimated transient temperature of the tires determined based on predicted driving conditions of the vehicle.

20. A control device configured to estimate a driving range for a vehicle, wherein the control device is configured to:

based on available driving energy for the vehicle, estimate the driving range taking into account an estimated variation in rolling resistance of the vehicle, wherein the estimated variation in rolling resistance of the vehicle is determined using a predetermined transient rolling resistance model into which transient tire temperature effects on rolling resistance are incorporated, wherein the transient tire rubber temperature used in the model is a tire rubber temperature of at least a portion of the tire that face towards a road surface; and approving or adjusting the planned upcoming driving event in dependence of whether the estimated driving range is determined to be sufficient or not for completing the planned upcoming driving event.

21. The control device according to claim 20, wherein the predetermined transient rolling resistance model takes into account ambient temperature.

22. The control device according to claim 20, wherein the predetermined transient rolling resistance model takes into account at least one parameter causing cooling of the tire during driving of the vehicle.

23. A vehicle comprising a control device configured to estimate a driving range for a vehicle, wherein the control device is configured to:

based on available driving energy for the vehicle, estimate the driving range taking into account an estimated variation in rolling resistance of the vehicle, wherein the estimated variation in rolling resistance of the vehicle is determined using a predetermined transient rolling resistance model into which transient tire temperature effects on rolling resistance are incorporated, wherein the transient tire rubber temperature used in the model is a tire rubber temperature of at least a portion of the tire that face towards a road surface; and approving or adjusting the planned upcoming driving event in dependence of whether the estimated driving range is determined to be sufficient or not for completing the planned upcoming driving event.

* * * * *